US 6,561,685 B2

(12) United States Patent
Weber et al.

(10) Patent No.: US 6,561,685 B2
(45) Date of Patent: May 13, 2003

(54) LIGHT ASSEMBLY FOR EXTERNAL REARVIEW MIRROR OF VEHICLES

(75) Inventors: Christine Weber, Esslingen (DE); Helmut Eberspächer, Esslingen (DE); Thomas Klett, Gomaringen (DE); Robert Apfelbeck, Plattling (DE)

(73) Assignee: Reitter & Schefenacker GmbH & Co. KG, Esslingen (DE)

( * ) Notice: Subject to any disclaimer, the term of this patent is extended or adjusted under 35 U.S.C. 154(b) by 0 days.

(21) Appl. No.: 09/852,312

(22) Filed: May 9, 2001

(65) Prior Publication Data

US 2001/0046136 A1 Nov. 29, 2001

(30) Foreign Application Priority Data

May 24, 2000 (DE) .......................................... 100 25 810

(51) Int. Cl.$^7$ ................................................. B60R 1/12
(52) U.S. Cl. ....................... 362/494; 362/230; 362/240; 362/545; 315/295; 315/185 R

(58) Field of Search ................................. 362/230, 231, 362/236, 240, 543–545, 494; 315/192, 185 R, 291, 294, 295

(56) References Cited

U.S. PATENT DOCUMENTS

| 4,277,819 A | * | 7/1981 | Sobota et al. ............... 362/545 |
| 6,268,702 B1 | * | 7/2001 | Fleck ..................... 315/185 R |
| 6,371,636 B1 | * | 4/2002 | Wesson ..................... 362/541 |

* cited by examiner

Primary Examiner—Sandra O'Shea
Assistant Examiner—Ali Alavi
(74) Attorney, Agent, or Firm—Gudrun E. Huckett

(57) ABSTRACT

A light assembly for exterior rearview mirrors of vehicles has a support and one or more first LEDs provided as luminous bodies arranged on the support. Two or more second LEDs are provided as luminous bodies and arranged on the support. The first LEDs have a current intensity that is higher than the current intensity of the second LEDs. At least one of the first LEDs is series connected to at least two of the second LEDs, and the at least two second LEDs are parallel connected to one another.

12 Claims, 4 Drawing Sheets

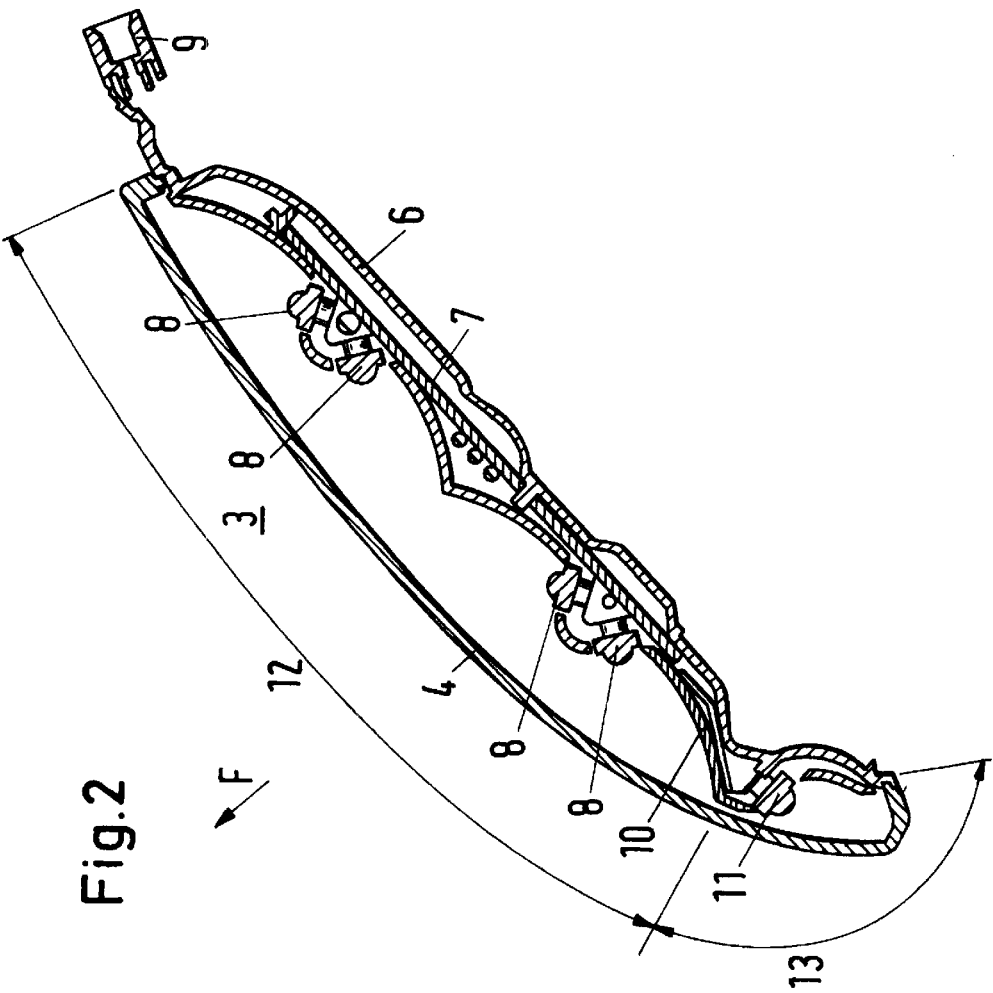

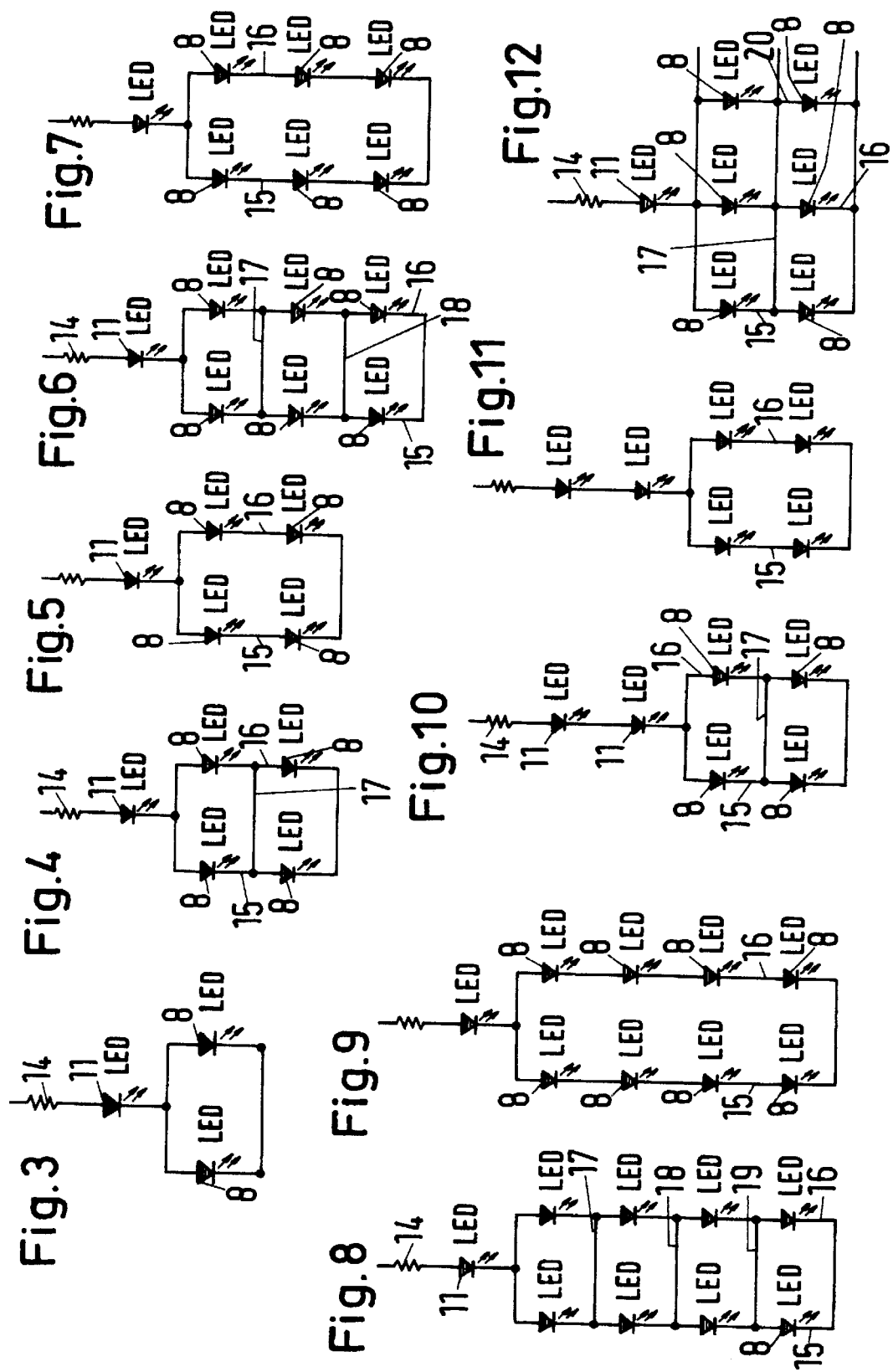

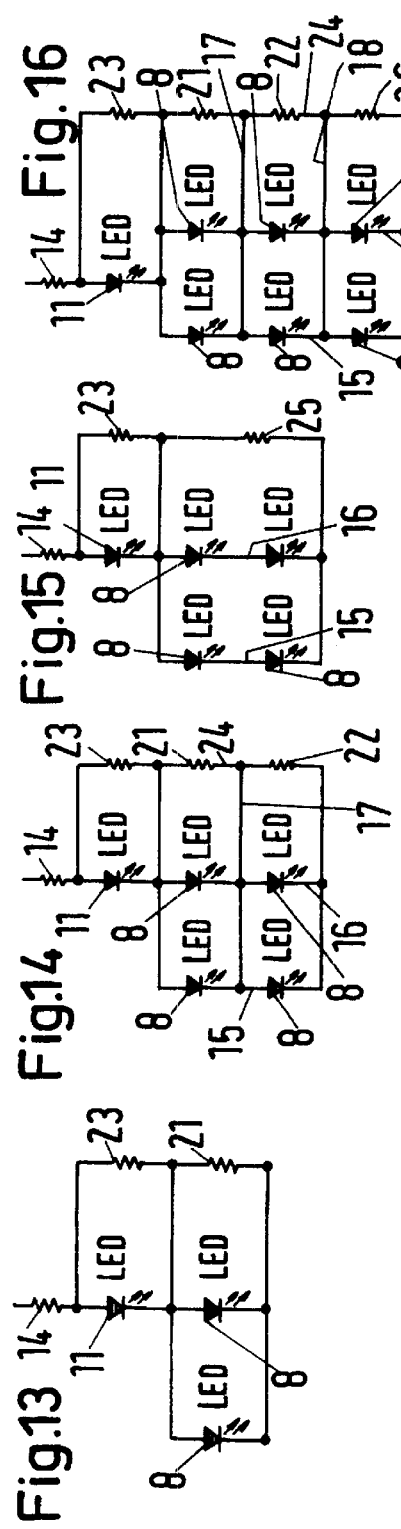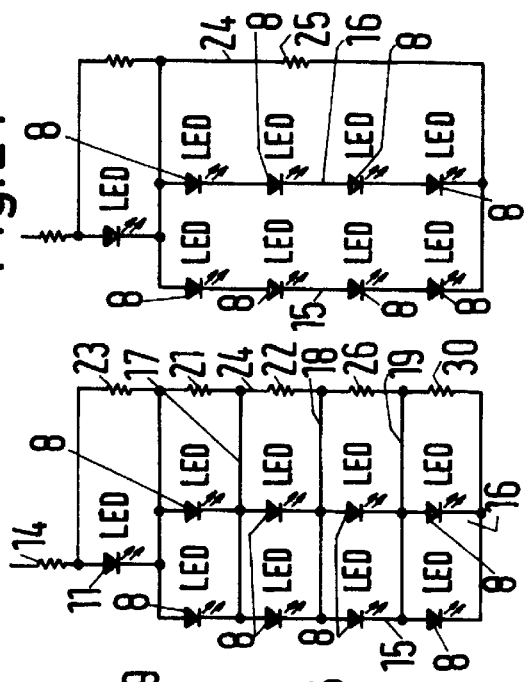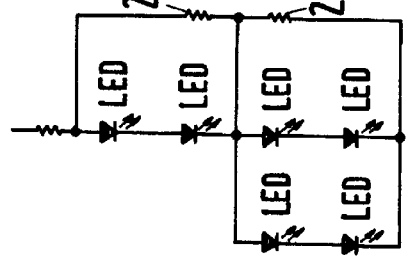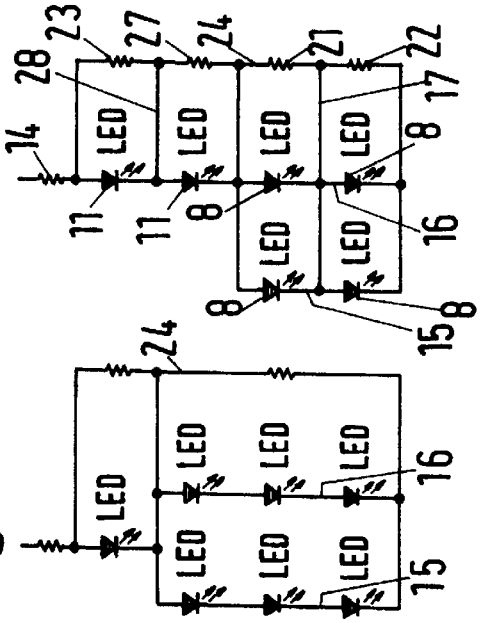

LIGHT ASSEMBLY FOR EXTERNAL REARVIEW MIRROR OF VEHICLES

BACKGROUND OF THE INVENTION

1. Field of the Invention

The invention relates to a light assembly, in particular, for exterior rearview mirrors of vehicles, preferably of motor vehicles, with at least one support on which LEDs are provided as luminous bodies

2. Description of the Related Art

Light assemblies are known which are arranged in the exterior rearview mirrors of motor vehicles and serve as auxiliary turn signals. The light assembly has a lens of light guiding material on whose one edge the LEDs are arranged. The light emitted by them is guided farther by this light guiding material.

SUMMARY OF THE INVENTION

It is an object of the present invention to configure the light assembly of the aforementioned kind such that with a constructively simple configuration an optimal function of the light is obtained.

In accordance with the present invention, this is achieved in that at least one first LED with higher current intensity is series connected to at least two second LEDs of lower current intensity which, in turn, are parallel connected to one another.

The light assembly according to the invention has LEDs which are provided for at least two different current intensities. With the first LED, which is provided for the higher current intensity, the light intensity required for the respective application is achieved. The second LEDs, which are configured for a lower current intensity, can be used for a uniform illumination. The light assembly according to the invention can advantageously be provided as an auxiliary turn signal in an exterior rearview mirror of the motor vehicle. With the first LED having greater light intensity the legal requirements with respect to the light value for turn signal operation can be fulfilled. The second LEDs having a lower light intensity serve for a uniform illumination of the light assembly, respectively, its lens. As a result of the configuration according to the invention these different requirements can be fulfilled with a small number of LEDs. As a result of the use of LEDs, heat development in the light assembly is very minimal. Also, the thermal degradation can be kept small. The LEDs are characterized moreover by a long service life.

BRIEF DESCRIPTION OF THE DRAWING

In the drawing:

FIG. 2 is a section of a support of the light assembly according to the present invention;

FIG. 3 is a first embodiment of a circuit of the light assembly according to the invention;

FIG. 4 is a second embodiment of a circuit of the light assembly according to the invention;

FIG. 5 is a third embodiment of a circuit of the light assembly according to the invention;

FIG. 6 is a fourth embodiment of a circuit of the light assembly according to the invention;

FIG. 7 is a fifth embodiment of a circuit of the light assembly according to the invention;

FIG. 8 is a sixth embodiment of a circuit of the light assembly according to the invention;

FIG. 9 is a seventh embodiment of a circuit of the light assembly according to the invention;

FIG. 10 is a eighth embodiment of a circuit of the light assembly according to the invention;

FIG. 11 is a ninth embodiment of a circuit of the light assembly according to the invention;

FIG. 12 is a tenth embodiment of a circuit of the light assembly according to the invention;

FIG. 13 is a eleventh embodiment of a circuit of the light assembly according to the invention;

FIG. 14 is a twelfth embodiment of a circuit of the light assembly according to the invention;

FIG. 15 is a thirteenth embodiment of a circuit of the light assembly according to the invention;

FIG. 16 is a fourteenth embodiment of a circuit of the light assembly according to the invention;

FIG. 17 is a fifteenth embodiment of a circuit of the light assembly according to the invention;

FIG. 18 is a sixteenth embodiment of a circuit of the light assembly according to the invention;

FIG. 19 is a seventeenth embodiment of a circuit of the light assembly according to the invention;

FIG. 20 is a eighteenth embodiment of a circuit of the light assembly according to the invention; and FIG. 21 is a nineteenth embodiment of a circuit of the light assembly according to the invention;

DESCRIPTION OF THE PREFERRED EMBODIMENTS

Figure 1:
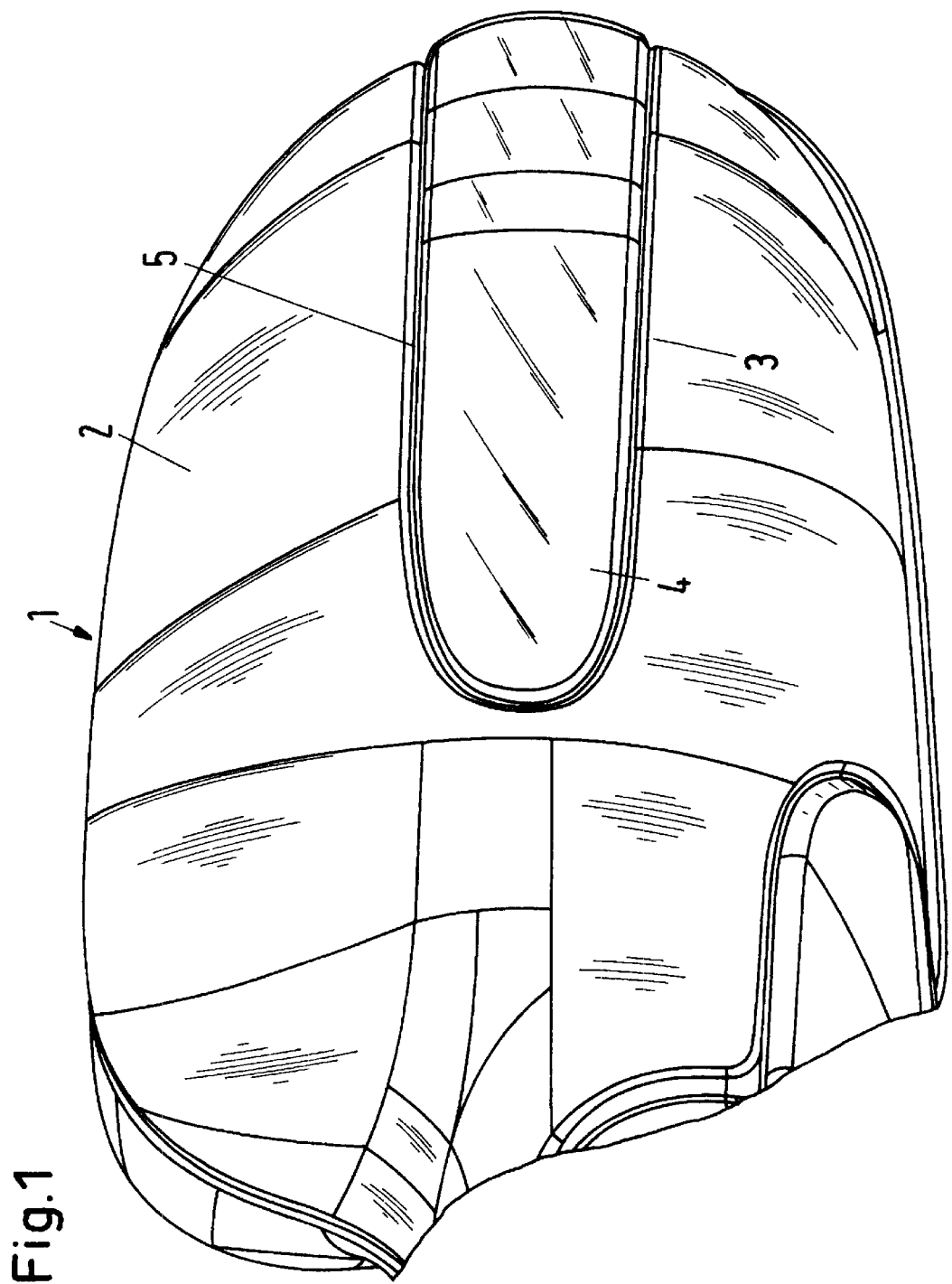
FIG. 1 is a perspective illustration of a part of the light assembly according to the present invention mounted in an exterior rearview mirror.

The exterior rearview mirror is fastened in a manner known in the art by means of a mirror base (not illustrated) on a vehicle, preferably on a motor vehicle. A mirror head 1 is supported on the mirror base which can be pivoted in and counter to the travel direction of the vehicle relative to the mirror base. The mirror head 1 has a mirror support (not illustrated) on which the drive for a mirror glass support is fastened. The mirror support is enclosed by a mirror cover 2. Within the mirror head 1 a light assembly 3 is arranged at a spacing from the mirror base which is in the form of a turn signal in the shown embodiment. The light assembly 3 has a lens 4 through which the light of the light assembly 3 exits to the exterior. The mirror cover 2 is provided with a corresponding cutout 5 in which the lens 4 is inserted. The cutout 5 is positioned at half the height of the mirror cover, viewed counter to the travel direction of the vehicle, and extends outwardly approximately from a location at half the length of the mirror cover. The outer end of the lens facing away from the mirror base is curved about the end of the mirror cover 2 facing away from the mirror base so that the lens 4 extends into the vicinity of the edge of the mirror cover surrounding the mirror glass of the exterior review mirror.

The light assembly 3 has a support 6 (FIG. 2) on which a circuit board 7 is supported which supports several luminous bodies in the form of LEDs 8. On the edge of the support 6 the edge of the lens 4 is fastened. Moreover, on the support 6 a socket 9 is provided which serves for receiving a plug in order to supply the required current for operating the LEDs 8.

The LEDs 8 project through openings in a reflector 10 which guides the light emitted by the LEDs to the front toward the lens 4.

In the end area facing away from the mirror base the light assembly 3 is provided with at least one LED 11 which is configured for a higher current intensity than the other LEDs 8. The light emitted by the LED 11 is directed outwardly transverse to the travel direction F of the vehicle. Since the LED 11 has a greater light intensity than the LEDs 8, the light emitted by the LED 11 is sufficiently strong in order to be reliably noticed by other traffic participants in traffic. When the light assembly 3 is configured as a turn signal, the blinking light that is emitted by the LED 11 is recognized clearly.

The LEDs 8 with the lower light intensity are arranged in an area behind the lens 4 which is positioned at the backside of the mirror cover 2. Accordingly, the light emitted by the LEDs 8 is emitted through the lens 4 substantially forwardly in the travel direction F. The LEDs 8 are arranged in this area such that the area facing forwardly in the travel direction F is illuminated uniformly when the LEDs 8 are switched on. The adjoining area 13 extending to the end of the lens 4 facing away from the mirror base is correlated with the LED 11 so that in this area the required high light intensity for the turn signal function is achieved.

The light assembly 3 is advantageously an assembly unit which is simply inserted into the mirror head 1. For example, the light assembly 3 can be snapped into place in a corresponding receptacle of the mirror head 1.

FIG. 3 shows a first embodiment of a circuit of the light assembly 3. A resistor 14 is series connected upstream of the LED 11. The LED 11 in the embodiment is suitable for a current intensity of 150 mA. The LED 11 has connected downstream thereof two LEDs 8 which are configured for lower current intensities, in the embodiment for 70 mA. The two LEDs 8 are parallel connected with one another as well as series connected to the LED 11. The LEDs 8 are provided for achieving a uniform illumination of the lens 4 in the lens area 12 (FIG. 2). Accordingly, the LEDs 8 provided for a lower current intensity are sufficient. The LED 11 provides the turn signal function which requires a correspondingly high light intensity so that this LED 11 is configured in the described way for a higher current intensity. The sum of the currents of the parallel connected LEDs 8 flows through the LED 11, which is series connected to the two parallel connected LEDs 8.

FIG. 4 shows a second embodiment of a circuit of the light assembly 3. The resistor 14 is series connected upstream of the LED 11. The LED 11 in the shown embodiment is suitable for a current intensity of 150 mA. The LED 11 has series connected downstream thereof the LEDs 8 which are configured for lower current intensities, in the embodiment for 70 mA. Two LEDs 8 each are series connected, respectively, and, in turn, are parallel connected to one another. The LEDs 8 are positioned in two branch circuits 15 and 16 which in the area between the two LEDs 8 are connected to one another by a line 17. As in the previous embodiment, the LEDs 8 are provided for a uniform illumination of the lens 4 in the lens area 12 (FIG. 2). Accordingly, the LEDs 8 provided for a lower current intensity are sufficient. The LED 11 is provided for performing the turn signal function which requires a correspondingly high light intensity so that this LED 11 is configured in the described way for a higher current intensity.

By means of the line 17 it is ensured that, should one LED 8 fail in one of the two branch circuits 15, 16, the LED that is still intact in the corresponding branch circuit will still be illuminated.

FIG. 5 shows a simpler circuit in which the two branch circuits 15, 16 are not connected with one another. Should therefore, for example, in the branch circuit 15, one of the two LEDs 8 fail, the other LED 8 in this branch circuits 15 is not supplied with current so that it will accordingly not be illuminated. Otherwise, the embodiment according to FIG. 5 is identical to the embodiment of FIG. 4.

FIG. 6 shows an embodiment in which in each branch circuit 15, 16 three LEDs each are provided, respectively. In the area between the LEDs 8, the two branch circuits 15, 16 are connected to one another by the line 17, 18, respectively. The LEDs 8 positioned in the two branch circuits 15, 16 are parallel connected to one another. The LEDs 8 have series connected upstream thereof the LED 11 and the resistor 14. In this embodiment, in the luminous area 12 of the lens 4 a larger number of the LEDs 8 is provided. Accordingly, in this luminous area 12 a higher light intensity can be obtained as compared to the embodiments according to FIGS. 3 through 5. However, it is also possible to use this embodiment for a light assembly 3 whose lens area 12 is longer than that in the embodiment according to FIG. 2. The lines 17, 18 between the branch circuits 15, 16 ensure in this case that for a failure of one of the two LEDs 8 in one of the branch circuits the remaining LEDs in this branch circuit are still supplied with current and can thus be illuminated.

The embodiment according to FIG. 7 differs from the embodiment according to FIG. 6 only in that the two branch circuits 15, 16 between the LEDs 8 are not connected to one another by the lines.

In the embodiment according to FIG. 8, in each branch circuit 15, 16 four LEDs 8 are positioned which have series connected upstream thereof the LED 11 and the resistor 14. Between the LEDs 8 the branch circuits 15, 16 are connected to one another by lines 17 through 19.

In the embodiment according to FIG. 9, the two branch circuits 15, 16 in the area between the LEDs 8 are not connected to one another. Otherwise, this embodiment is identical to the embodiment according to FIG. 8.

FIG. 10 shows the possibility that in a circuit according to FIG. 4 two LEDs 11 are series connected upstream of the LEDs 8 in the two branch circuits 15, 16. The LEDs 11 are series connected. The resistor 14 is series connected upstream thereof. The two LEDs 11 are identical and suitable for higher current intensities than the LEDs 8 in the branch circuits 15, 16. In the area between the LEDs 8 the branch circuits 15, 16 are connected to one another by line 17. The two LEDs 11 are correlated with the lens area 13 (FIG. 2) so that from this lens area a correspondingly bright light will be emitted. Moreover, two LEDs 11 can also be provided when this is required by the shape of the light assembly 3.

In the embodiment according to FIG. 11 the line 17 between the two branch circuits 15 and 16 is missing. Otherwise, this embodiment is identical to the embodiment according to FIG. 10.

FIG. 12 shows the possibility of parallel connecting several LEDs 8. For example, two LEDs 8 each are parallel connected. Depending on the desired light intensity and/or shape of the light assembly 3, further LEDs 8 can be parallel connected. All LEDs 8 have series connected upstream thereof the LED 11 with the resistor 14. As in the previous embodiments, the LED 11 is configured for higher current intensities and provides the turn signal function in the embodiment, while the LEDs 8 configured for lower current intensities are provided for a uniform illumination of the lens area 12. In the area between the LEDs 8 the branch circuits 15, 16, 20, in which two LEDs are series connected, respectively, are connected by line 17 so that when, for example, one LED 8 in the branch circuit 15 fails, the other LED 8 in this branch circuit is still supplied with current and is thus illuminated.

In the embodiments according to FIGS. 3 through 12, the sum of the currents of the parallel connected LEDs 8 always flows through the LED 11 which is series connected to the parallel connected LEDs 8.

FIG. 13 shows an embodiment in which the parallel connected LEDs 8 have a resistor 21 parallel connected thereto. The two LEDs 8 are series connected to the LED 11 which has series connected thereto and upstream thereof the resistor 14. A resistor 23 is parallel connected to the LED 11 which is series connected to the resistor 21.

FIG. 14 shows an embodiment in which the parallel connected LEDs 8 in the branch circuits 15, 16 have two resistors 21, 22 parallel connected thereto which themselves are series connected to one another.

The LED 11 which is, in correspondence to the previous embodiments, series connected to the protective resistor 14, has a resistor 23 parallel connected thereto. The latter is series connected to the resistors 21, 22. The line 17 connects in the area between the LEDs the two branch circuits 15, 16. Moreover, the branch circuits 15, 16 are connected by the lines 17 with a branch circuit 24 in which the resistors 21 to 23 are positioned. The protective resistor 14 is not only series connected to the LED 11 but also to the resistors 21 to 23.

The embodiment according to FIG. 15 differs from the embodiment according to FIG. 14 only in that the line 17 is missing. In the branch circuits 15, 16 two LEDs 8 are again series connected which are parallel connected to the resistor 25. The LED 11 is parallel connected to the resistor 23 which, in correspondence to the previous embodiment, is series connected to the resistor 25 and the protective resistor 14.

FIG. 16 shows an embodiment in which three LEDs 8 and three resistors 21, 22, 26 are series connected, respectively, in the branch circuits 15, 16, 24. The branch circuits 15, 16, 24 are connected to one another in the area between the LEDs 8 and the resistors 21, 22, 26 by the lines 17, 18. The resistors 21, 22, 26 are series connected downstream of the resistor 23 which itself is series connected to the protective resistor 14. The resistor 23 is moreover parallel connected to the LED 11.

The embodiment according to FIG. 17 differs from the embodiment according to FIG. 16 only in that the connecting lines 17, 18 between the branch circuits 15, 16, 24 are missing.

FIG. 18 shows a circuit similar to the embodiment according to FIG. 10. It has the two LEDs 11 series connected to one another, with the resistor 14 series connected upstream thereof. The LEDs 8 are series connected in pairs downstream of the two LEDs 11 in the branch circuits 15, 16. The LEDs 8 in the two branch circuits 15, 16 are parallel connected to one another and to the resistors 21, 22 in the branch circuit 24. Resistors 23, 27 are parallel connected, respectively, to the two LEDs 11, and they are themselves series connected to the resistors 21, 22 in the branch circuit 24. The resistors 23, 27 are also series connected to the protective resistor 14 and downstream thereof. In the area between the two LEDs 11 the branch circuit 24 is connected by a line 28 with the branch circuit 16 in which the two LEDs 11 as well as the LEDs 8 arranged downstream thereof are positioned. The branch circuits 15, 16, 24 are connected to one another by the line 17 between the LEDs 8 and the resistors 21, 22. The lines 17, 28 ensure that, if one of the LEDs 8, 11 or the resistors 23, 27, 21, 22 fails, the remaining components in the corresponding branch circuits 15, 16, 24 will still operate.

The embodiment according to FIG. 19 differs from the previous embodiments only in that the connecting lines 17, 18 are missing. Correspondingly, in correspondence to the embodiments according to FIGS. 15 and 17, a parallel connected combined resistor 25, 29 is sufficient for the LEDs 8, 11.

In the embodiment according to FIG. 20, four LEDs 8 and four resistors 21, 22, 26, 30 are series connected, respectively, in the individual branch circuits 15, 16, 24. The LED 11 has series connected upstream thereof the resistor 14 and parallel connected the resistor 23 in the branch circuit 24. It is itself series connected to the resistors 21, 22, 26, 30 which, according to the preceding embodiments of FIGS. 14 to 19, are correlated with one LED 8 in each branch circuit 15, 16, respectively. In the area between the LEDs 8 and the resistors 21, 22, 26, 30 the branch circuits 15, 16, 24 are connected to one another by the lines 17, 18, 19.

The embodiment according to FIG. 21 differs from the preceding embodiment only in that the lines 17, 18, 19 between the branch circuits 15, 16, 24 are missing. Accordingly, for the LEDs in the branch circuits 15, 16 a common resistor 25 can be provided.

In the embodiment according to FIGS. 14 to 21, a precise adjustment of the individual LEDs 8, 11 can be obtained by means of the resistors parallel connected to the LEDs 8, 11. As a result of the value of the parallel connected resistors, the current intensity of the LEDs 8 and 11 parallel connected thereto can be affected. Accordingly, the light value of the LED(s) 11 can be adjusted independent of the light values of the LEDs 8. With the resistors the light intensity of the individual LEDs 8, 11 can thus be adjusted optimally to the application of the light assembly 3 and/or to its shape and/or its mounting location and/or the conditions of the surroundings of the light assembly.

The described circuits are used advantageously for a light assembly 3 of an exterior rearview mirror wherein for the lens area 13 facing away from the mirror base a greater light intensity is required than for the other lens area 12. Preferably, the light assembly in the exterior rearview mirror is a turn signal unit. The LED(s) 11 provide(s), as a result of the described circuits, the high light intensity required for traffic safety. For the LEDs 8 which are configured for reduced current intensities in comparison to the LEDs 11, it is sufficient when they uniformly illuminate the lens area 12 which is facing forwardly in the travel direction F of the vehicle. This lens area 12 is not important for the turn signal function.

The described circuits can be used, for example, also for the interior illumination of a motor vehicle for which it is also required that differently strong light intensities are produced. For example, it is possible to arrange a light assembly in the interior rearview mirror as a reading light. In this case, the LEDs 11 of strong light intensity can be adjusted such that the light emitted by them impinges on the seat area of the driver and/or front passenger of the vehicle so that, for example, maps can be easily read. The LEDs 8 of reduced light intensity serve only for an ambient illumination, for example, for illuminating the dashboard of the vehicle. Moreover, the light assembly 3 can also be any other suitable signal light which also emits light of different intensity.

While specific embodiments of the invention have been shown and described in detail to illustrate the inventive principles, it will be understood that the invention may be embodied otherwise without departing from such principles.

What is claimed is:

1. A light assembly for exterior rearview mirrors of vehicles, the light assembly comprising:

a support (6);

one or more first LEDs (11) provided as luminous bodies and arranged on said support (6);

two or more second LEDs (8) provided as luminous bodies and arranged on said support (6);

wherein said first LEDs (11) have a current intensity that is higher than a current intensity of said second LEDs (8);

wherein at least one of said first LEDs (11) is series connected to at least two of said second LEDs (8) and wherein said at least two second LEDs (8) are parallel connected to one another;

wherein said at least two second LEDs (8) are arranged in a LED branch circuit (15, 16, 20), respectively, and wherein said LED branch circuits (15, 16, 20) comprise at least two of said second LEDs (8), respectively;

at least one line (17, 18, 19) connecting said LED branch circuits (15, 60, 20) to one another between said second LEDs (8): and a first resistor (23) parallel connected to said at least one first LED (11).

2. A light assembly for exterior rearview mirrors of vehicles, the light assembly comprising:

a support (6);

one or more first LEDs (11) provided as luminous bodies and arranged on said support (6);

two or more second LEDs (8) provided as luminous bodies and arranged on said support (6);

wherein said first LEDs (11) have a current intensity that is higher than a current intensity of said second LEDs (8);

wherein at least one of said first LEDs (11) is series connected to at least two of said second LEDs (8) and wherein said at least two second LEDs (8) are parallel connected to one another;

wherein the current intensity of said first LEDs (11) is approximately twice as high as the current intensity of said second LEDs (8).

3. The light assembly according to claim 2, wherein said at least two second LEDs (8) are arranged in a LED branch circuit (15, 16, 20), respectively, and wherein said LED branch circuits (15, 16, 20) comprise at least two of said second LEDs (8), respectively.

4. The light assembly according to claim 3, further comprising at least one line (17, 18, 19) connecting said LED branch circuits (15, 60, 20) to one another between said second LEDs (8).

5. The light assembly according to claim 4, further comprising a first resistor (23) parallel connected to said at least one first LED (11).

6. The light assembly according to claim 1, further comprising second resistors (21, 22, 26, 30) parallel connected to said second LEDs (8), respectively.

7. The light assembly according to claim 6, wherein said first and second resistors (21, 22, 23, 26, 30) are series connected to one another.

8. The light assembly according to claim 6, wherein said first and second resistors (21, 22, 23, 26, 30) are arranged in a resistor branch circuit (24) and said resistor branch circuit (24) Is connected by said at least one line (17, 18, 19) to said LED branch circuits (15, 16, 20).

9. The light assembly according to claim 1, wherein said second LEDs (8) have identical current intensities.

10. The light assembly according to claim 1, wherein said first LEDs (11) have identical current intensities.

11. The light assembly according to claim 1, further comprising a resistor (14) series connected upstream of said at least one first LED (11).

12. The light assembly according to claim 1, wherein two of said first LEDs (11) are series connected to one another.

* * * * *